Oct. 27, 1953 P. HAMPE 2,657,339
METHOD AND APPARATUS FOR PRODUCING
ELECTRIFIED POWDERS BY FRICTION
Filed July 23, 1947
FIG. 3
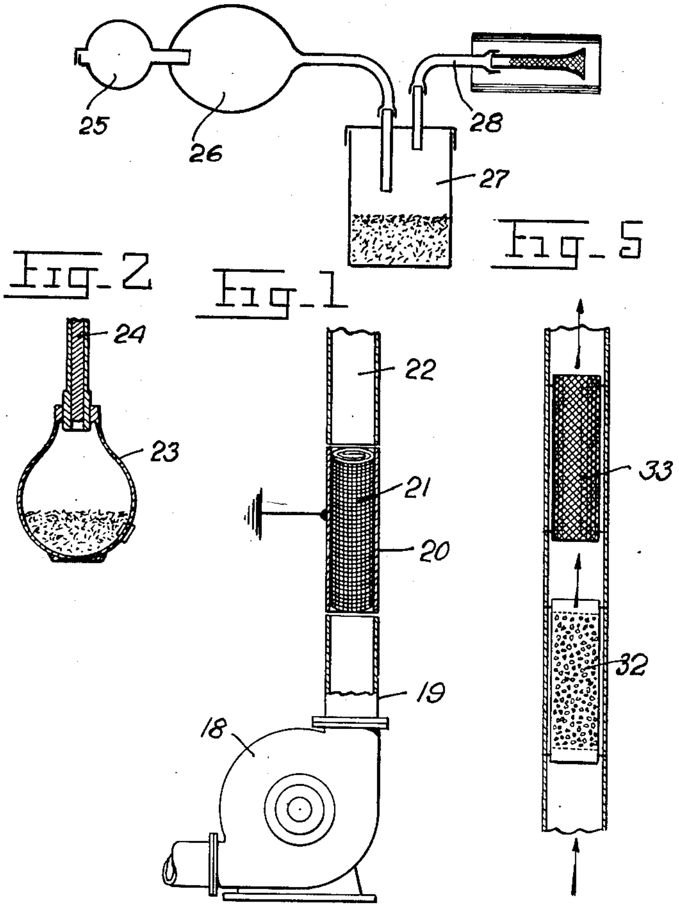
FIG. 2, FIG. 1, FIG. 5
FIG. 4
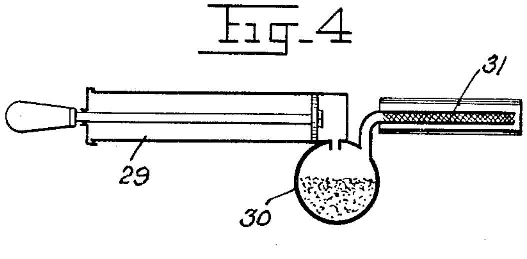

Patented Oct. 27, 1953

2,657,339

UNITED STATES PATENT OFFICE 2,657,339

METHOD AND APPARATUS FOR PRODUCING ELECTRIFIED POWDERS BY FRICTION

Pierre Hampe, Versailles, France, assignor of one-half to Georges Truffaut, Paris, France Application July 23, 1947, Serial No. 763,132
In France August 3, 1946

7 Claims. (Cl. 317—3)

1

Electrified powders are used in particular for agricultural or industrial powdering, for producing high voltages.

The co-pending application, Serial Number 763,133, which is now abandoned, provided the possibility of electrifying powders by friction. Further research has made it possible to ascertain the means which it is necessary to use for obtaining this object. During this research it has been discovered in particular that:

1. In order suitably to electrify the powder it is necessary to make all the grains come into contact with the friction surface and even to make each grain effect several successive contacts. Simple partitions arranged as baffles are not sufficient for obtaining this result, since the current of gas flows around these obstacles and imparts the same movement to the particles.

The invention comprises in particular providing numerous contacts between the grains of powder and the friction member, by arranging numerous small obstacles, threads for example, in the path of grains.

2. At the instant when a grain of powder comes into contact with the friction surface, said grain must not be subjected to the effect of an opposing magnetic field which may be due, either to the charge of the adjacent grains of powder, or to the charge of the friction surface.

In order to obviate these drawbacks, the invention comprises, either dividing the space a very large number of times by means of threads or similar small objects forming a multiplicity of electrostatic screens, or arranging the friction members in such a manner that the charges which are deposited thereon are symmetrical with respect to the grains of powder.

3. The electrified grains must not remain adhering to the friction surface by electrostatic attraction, which would prevent fresh grains from coming into contact with the friction surface and might cause the apparatus to become obstructed.

Furthermore, electrified grains must never be allowed to collect together, since there would thus be a risk of their mutually repellant charges escaping.

The devices described obviate these drawbacks, since the current of gas that carries the powder along readily sweeps clean the small obstacles used, and movement of these obstacles dislodges the powder particles. The flow of gas is at a relatively slow speed, being sufficient to carry the particles of powder through the devices of the invention.

2

4. The nature of the powders and of the friction surfaces determines the polarity of the charges exchanged, and to a certain extent the magnitude of said charges. It has been ascertained for various powders, which friction substance is the most suitable for each of them.

Resilient friction substances that resist wear should preferably be chosen, since the carrying away of the material of the friction member hinders the separation of the charges of opposite polarity.

Care should also be taken to prevent dampness, which impairs the electrification by friction.

Amongst the substances which are particularly suitable for constructing the friction members, mention is made of rubber, silk, horse-hair, threads and plastic material.

5. In the case in which a powder is to be used which is difficult to electrify, such powder may be mixed with another powder that holds the charge well, for example sulphur, casein, anthraquinone and lime. In certain cases it may be preferably only to mix the two powders after one of them has passed through the electrifying device, in order not to hinder its electrification.

6. The powders which have been electrified under the conditions hereinbefore described can be projected, without special care, on to the objects to be powdered. It is also possible to set up an electric field round the object to be powdered, in order to activate precipitation.

For carrying out the principles hereinbefore explained, devices for electrifying powders have been constructed as follows.

The current of air charged with powder is conveyed through a tube containing numerous small obstacles which are evenly distributed throughout the available volume.

Such obstacles may comprise fine threads, wires, etc. They may be insulating or more or less conducting.

Such a device definitely corresponds to the invention.

It provides a large contact area.

The space is divided into fairly small portions so that the grains of powder cannot create an intense electric field therein.

If the obstacles are sufficiently conducting, they readily allow the charges which they collect to be eliminated. If they are not, their symmetrical arrangement causes said charges to have little action on the development of fresh charges.

The small obstacles, in particular the threads, are swept clean by the current of air and no accumulations of powder are formed. Moreover the flow of gas effects a movement of the fine filamentary elements so as to dislodge any particles that may have settled on them.

In order to make the invention more clearly understood, several embodiments have been illustrated in the accompanying diagrammatic drawings which are given by way of non-limitative examples.

Fig. 1 is a section of an apparatus for producing electrified powder, provided with a tube containing a network of wire.

Fig. 2 is a section of an apparatus provided with a tube containing obstacles.

Fig. 3 is a modification of Fig. 2.

Fig. 4 shows an apparatus provided with a piston pump.

Fig. 5 shows a combined apparatus provided with a tube containing a network of wire and with a tube containing obstacles.

In Fig. 1 of the accompanying drawings, an embodiment of a device for producing electrified powder has been shown by way of a non-limitative example, which is provided with a centrifugal fan 18 producing a current of air in the tube 19. A certain quantity of powder may be introduced into this air current.

The mixture of air and powder reaches the tube 20 which is electrically connected to the earth. The inside of the tube 20 is substantially filled by a cylindrical roll 21 obtained by winding a long strip of wire gauze formed by stainless steel wires of a few hundredths of a millimeter diameter. The whole arrangement forms a network of wires which is sufficiently open for the air current charged with powder to pass readily through it and the particles are charged by striking the wires of the network.

At 22 is shown an insulating tube which serves to convey the air charged with electrified powder towards the apparatus by which it is to be used: electric powdering machine, collector of electrostatic machines, etc.

In the previous example, the electrifying device essentially comprises a network of steel wires. It would be possible to use any other wires of sufficient conductivity grouped in screens, pads, etc.

The electrifying devices hereinbefore referred to are supplied with air charged with powder, by means of known apparatus such as: rubber bulbs, a piston pump, a compressed gas cylinder, etc.

In Fig. 2, a rubber bulb 23 has been shown by way of example which contains powder and is provided with an electrifying tube 24 containing obstacles, and in Fig. 3 a distributing apparatus has been shown in which bulbs 25, 26 supply the air to a powder container 27 provided with an outlet for the powder through an electrifying tube 28 containing obstacles. In the embodiment of Fig. 4, a pump 29 is attached to a receptacle 30 containing the powder, provided with an outlet tube 31 which is an electrifying tube containing obstacles.

In Fig. 5 a complex electrifying apparatus has been provided in which the powder successively passes through two tubes 32, 33, the first containing obstacles such as balls and the second a pad of wire gauze.

As a mixture of air and powder is blown through an electrifying device in accordance with the invention comprising a conduit and a multiplicity of filiform elements such as wires, filaments, hair or threads substantially filling the cross section of the conduit, the particles of powder are electrified by frictional engagement with the filamentary elements. The elements are disposed so as to provide in a direction generally lengthwise of the conduit a maze of small, tortuous, non-parallel, repeatedly branching passageways of varying cross section so that it is virtually impossible for particles of powder to find their way through the maze without engaging one or more of said elements. In fact, each particle has repeated frictional contacts with said elements during its passage through the conduit and thereby receives a high electric charge. Moreover the filamentary elements, being flexible by virtue of their small size, are vibrated by the flow of air through the conduit and this movement of the elements assists in preventing particles of the powder from lodging on them. The electrifying device in accordance with the invention is thus self-cleaning. As indicated above, many different kinds of filamentary elements may be used and they may be arranged in the conduit in different ways. It is preferable that the filaments be relatively fine, e. g. of a diameter of the same order of magnitude as the particles of powder.

The apparatus in accordance with the invention may be used for electrifying many different kinds of powders. Some powders are more difficult to electrify than others. When it is desired to use a powder that is hard to electrify or one that does not hold a charge well, it has been found that good results can be obtained by mixing it with a powder having good electrifying characteristics, e. g. sulphur, casein, anthraquinone and lime. The powders may be mixed ahead of the electrifying device or the powder having better charge-holding characteristics may be electrified first and the other powder then introduced into the air stream. Among the substances that can be electrified in accordance with the invention are silica and metal oxides in addition to those mentioned above.

The invention herein described has the further advantage that particles of powder can be electrified by friction even though the speed of the current of gas carrying them through the electrifying device is relatively low. Hence it is not necessary to use a high speed blower or high air pressure and the amount of energy required is correspondingly less. There is also less dispersal of the powder by the air.

The foregoing examples are not intended for any other purpose than to illustrate the principle of the apparatus. For example, the nature and arrangement of the filamentary elements and the composition of the powders are essentially variable. Likewise, any suitable means may be used for producing a flow of gas through the electrifying device and for introducing the powder into the air stream. The method and apparatus in accordance with the invention is susceptible of wide use.

I claim:

1. A device for dusting plants and the like comprising means for providing a supply of powder, means for providing a flow of gas to carry the powder and means for electrifying solely by friction the particles of powder carried by the flow of gas, said friction electrifying means comprising a conduit connected to said means providing a flow of gas carrying said powder and netting disposed in said conduit and extending longitudinally of said conduit, said netting comprising a plurality of thicknesses substantially filling the cross-section of the conduit for a substantial portion of its length, with interstices between the thicknesses.

2. A method of electrifying particles of a powder for agricultural dusting purposes which comprises mixing said powder with a second powder which holds its charge well and subjecting a stream of said powders in gaseous dispersed form to frictional electrification by repeated contact of the powder particles with obstacles disposed longitudinally of the particle stream.

3. A device for dusting plants and the like with electrified powder comprising a conduit having an inlet end and a discharge end, means connected to the inlet end of said conduit for producing a flow of gas therethrough, the discharge end of the conduit being directed toward the object to be dusted, means for introducing powder into said gas flow in advance of said conduit, means for electrifying the particles of said powder by friction comprising a multiplicity of movable filiform elements substantially filling said conduit for a substantial portion of its length with interstices between the elements providing a multiplicity of small tortuous repeatedly branching passageways for said gas and powder, said elements being movable by the flow of said gas to change the passageways and inhibit the lodging of particles in said interstices.

4. A device for dusting plants and the like comprising means for providing a supply of powder, means for producing a flow of gas to carry the powder and means for electrifying by friction the particles of powder carried along by the flow of gas, said friction-electrifying means comprising a conduit connected to said flow-producing means and a multiplicity of non-parallel filiform elements in said conduit, said elements substantially filling the cross section of said conduit and providing, in a direction generally lengthwise of said conduit, a maze of small, tortuous, non-parallel, repeatedly branching passageways of varying cross-section through which said gas carrying said powder flows, and said powder supply means including means for supplying two different powders in the gas flow, one of which has the characteristic of holding an electric charge.

5. A device for dusting plants and the like comprising means for providing a supply of dusting powder, means for producing a flow of gas to carry the powder and means for electrifying by friction the particles of powder carried along by the flow of gas, said friction-electrifying means comprising a conduit connected to said flow-producing means and a multiplicity of non-parallel filiform elements in said conduit, said elements substantially filling the cross section of said conduit and providing in a direction generally lengthwise of said conduit a maze of small, tortuous, non-parallel, repeatedly branching passageways of varying cross-section through which said gas carrying said powder flows, whereby said particles are electrically charged by repeated frictional contacts with said elements.

6. In a device for dusting plants and the like, an elongated tubular casing open at its ends, means connected to one end of said casing for producing a flow of gas lengthwise through said casing, means for feeding powder particles into said gas flow so as to be carried through said casing by the gas, and a multiplicity of non-parallel filiform elements disposed in said casing throughout substantially its entire cross-section and a substantial portion of its length, said elements dividing the path of the gas and powder through the casing into a maze of small, tortuous, non-parallel, repeatedly branching passageways of varying cross-section in the direction of flow of said gas, said elements blocking any straight-through flow of gas through said casing, whereby the particles of powder carried by the gas are electrically charged by repeated frictional contacts with said elements.

7. A device for dusting plants and the like comprising means for providing a supply of powder, means for providing a flow of gas to carry the powder and means for electrifying solely by friction the particles of powder carried by the flow of gas, said electrifying means comprising a conduit connected to said means providing a flow of gas carrying said powder and a multiplicity of flexible filamentary elements disposed in said conduit and extending longitudinally thereof, said elements substantially filling the cross section of the conduit and providing between them a multiplicity of small passageways which extend longitudinally of the elements and are interconnected with one another along their length, the flexibility of said elements permitting flexing of said elements to inhibit the lodging of particles of said powders on said elements.

PIERRE HAMPE.

References Cited in the file of this patent

UNITED STATES PATENTS

| Number | Name | Date |
|---|---|---|
| 1,221,505 | Bradley et al. | Apr. 3, 1917 |
| 1,446,778 | Witte | Feb. 27, 1923 |
| 1,723,955 | Shepard | Aug. 6, 1929 |
| 2,114,682 | Gamaer | Apr. 19, 1938 |
| 2,165,946 | Smith | July 11, 1939 |
| 2,247,963 | Ransburg et al. | July 1, 1941 |
| 2,396,533 | Root | Mar. 12, 1946 |
| 2,477,947 | Yadoff | Aug. 2, 1949 |

OTHER REFERENCES

Static Electricity, U. S. Dept. of Commerce, National Bureau of Standards, Circular C438, for sale by the Supt. of Documents, Washington, D. C. (esp. pp. 9 and 34).

Generation of Static Electricity in Blower Systems, Underwriters' Laboratories, Inc., Bulletin of Research No. 8, April 1939, 161 Sixth Ave., N. Y., (Copy in Patent Office Library, TH-9241-U56.) (Especially pp. 6, 11, 12 and 13.)

D. C. Current Generator, by R. E. Vollrath, Physical Review, October 15, 1932, volume 42, pages 298-304, esp. pages 298 and 304.